US005693527A

United States Patent [19]
Imamura

[11] Patent Number: 5,693,527
[45] Date of Patent: Dec. 2, 1997

[54] PROCESS FOR DECOMPOSING A CHLOROORGANIC COMPOUND WITH MICROORGANISM AND PROCESS FOR REMEDYING ENVIRONMENT WITH MICROORGANISM

[75] Inventor: Takeshi Imamura, Chigasaki, Japan

[73] Assignee: Canon Kabushiki Kaisha, Tokyo, Japan

[21] Appl. No.: 361,096

[22] Filed: Dec. 21, 1994

[30] Foreign Application Priority Data

Dec. 22, 1993 [JP] Japan ................................. 5-324962
Dec. 24, 1993 [JP] Japan ................................. 5-326939

[51] Int. Cl.$^6$ ........................................................ C02F 3/00
[52] U.S. Cl. ...................... 435/262; 435/262.5; 435/874; 435/877
[58] Field of Search ................................. 210/600, 601; 588/205, 207, 248; 435/262, 262.5, 821, 874, 877

[56] References Cited

U.S. PATENT DOCUMENTS

| | | | |
|---|---|---|---|
| 4,000,032 | 12/1976 | Bergstrom | 162/21 |
| 4,017,642 | 4/1977 | Orth, Jr. et al. | 426/69 |
| 4,323,367 | 4/1982 | Ghosh | 48/197 A |
| 4,576,609 | 3/1986 | Hageman | 8/103 |
| 4,662,900 | 5/1987 | Ottengraf | 55/90 |
| 4,713,343 | 12/1987 | Wilson, Jr. et al. | 435/264 |
| 4,853,334 | 8/1989 | Vandenbergh et al. | 435/262 |
| 4,925,802 | 5/1990 | Nelson et al. | 435/262 |
| 4,959,315 | 9/1990 | Nelson et al. | 435/167 |
| 5,071,735 | 12/1991 | Ichijima et al. | 430/505 |
| 5,464,771 | 11/1995 | Bryant et al. | 435/262.5 |
| 5,476,788 | 12/1995 | Lamar et al. | 435/262.5 |
| 5,476,992 | 12/1995 | Ho et al. | 588/204 |

FOREIGN PATENT DOCUMENTS

| | | |
|---|---|---|
| 0289350 | 11/1988 | European Pat. Off. |
| 4104624 | 1/1993 | Germany |

OTHER PUBLICATIONS

Nelson et al., "Aerobic Metabolism of Trichloroethylene by a Bacterial Isolate", Appl. & Envr. Micro., vol. 52, No. 2, Aug. 1986, pp. 383–384.

J. of Japan Sewage Works Asso., vol. 24, No. 273, 1987, pp. 27–33.

Nelson, et al., "Biodegration of Trichloroethylene and Involvement of an Aromatic Biodegradative Pathway" Appl. & Envron. Microbiol., vol. 53, No. 5, May 1987, pp. 949–954.

Little, et al., "Trichloroethylene Biodegration by a Methane–Oxidizing Bacterium, Appl. & Envron. Microbiol.", vol. 54, No. 4, Apr. 1988, pp. 951–956.

Wackett, et al., "Degradation of Trichloroethylene by Toluene Dioxygenase in Whole–Cell Studies with Pseudomonas putida F1", Appl. & Envron. Microbiol., vol. 54, No. 7, Jul. 1988, pp. 1703–1708.

Winter, et al., "Efficient Degradation of Trichloroethylene by a Recombinant *Escherichia coli*", Biotechnology, vol. 7, Mar. 1989, pp. 282–285.

Vandenbergh, et al., "Metabolism of Volatile Chlorinated Aliphatic Hydrocarbons by Pseudomonas fluorescens", Appl. & Envron. Microbiol., vol. 54, No. 10, Oct. 1988, pp. 2578–2579.

Hanson, et al., "Development of Methanotrophs for the Biodegradation of Trichlorethylene and Other Chlorinated Olefins", Am. Chem. Soc. Natl. Meet. Div. Environ. Microbiol., vol. 29, No. 365, 1989, pp. 365–367.

Uchiyama, et al., "Aerobic Degradation of Trichloroethylene by a New Type II", Agric. Biol. Chem., vol. 53, No. 11, pp. 2903–2907, 1989.

Tsien, et al., "Biodegradation of Trichloroethylene by Methylosinus trichosporium OB3b", Appl. & Environ. Microbiol., vol. 55, No. 12, Dec. 1989, pp. 3155–3161.

Kamath, et al., "New Pathway for the Biodegradation of Indole in Aspergillus niger", Appl. & Environ. Microbiol., vol. 56, No. 1, Jan. 1990, pp. 275–280.

Gannon, et al., "Relationship between Cell Surface Properties and Transport of Bacteria through Soil", Appl. & Environ. Microbiol., vol. 57, No. 1, Jan. 1991, pp. 190–193.

Negoro, et al., "Growth of Microalagae in High $CO_2$ Gas and Effects of $SiO_x$ and $NO_x$", Appl. Biochem. & Biotechn., vol. 28/29, Spring 1991, pp. 877–885.

Nakajima et al., "Novel Metabolite of Trichloroethylene in a Methanotrophic Bacterium, Methylocystis sp. M, and Hypothetical Degradation Pathway", Biosci. Biotech. Biochem, vol. 56, No. 3, pp. 486–489, Mar. 1992.

Nakajima et al., "Purification and Properties of a Soluble Methane Monooxygenase from Methylocystis sp. M.", Biosci. Biotech. Biochem., vol. 56, No. 5, May 1992, pp. 736–740.

Fujita, et al., "Accelerated Phenol Removal by Amplifying the Gene Expression with a Recombinant Plasmid Encoding Catechol–2,3–Oxygenase, Wat. Res.", vol. 27, No. 1, pp. 9–13, 1993.

Chemistry Today, No. 269, pp. 24–41, Aug. 1993.

*Primary Examiner*—Donald E. Czaja
*Assistant Examiner*—Curtis E. Sherrer
*Attorney, Agent, or Firm*—Fitzpatrick, Cella, Harper & Scinto

[57] ABSTRACT

A process is disclosed in which a chloroorganic compound is decomposed by means of a microorganism. The relevant microorganisms are induced to do so by contact with an aromatic compound which may be extracted from a plant containing lignocellulose or may be p-coumaric acid. It is believed that these compounds stimulate the microorganism to express oxygenase, and that the presence of oxygenase in the microroganism enables it to decompose the chlororoganic compound.

7 Claims, 7 Drawing Sheets

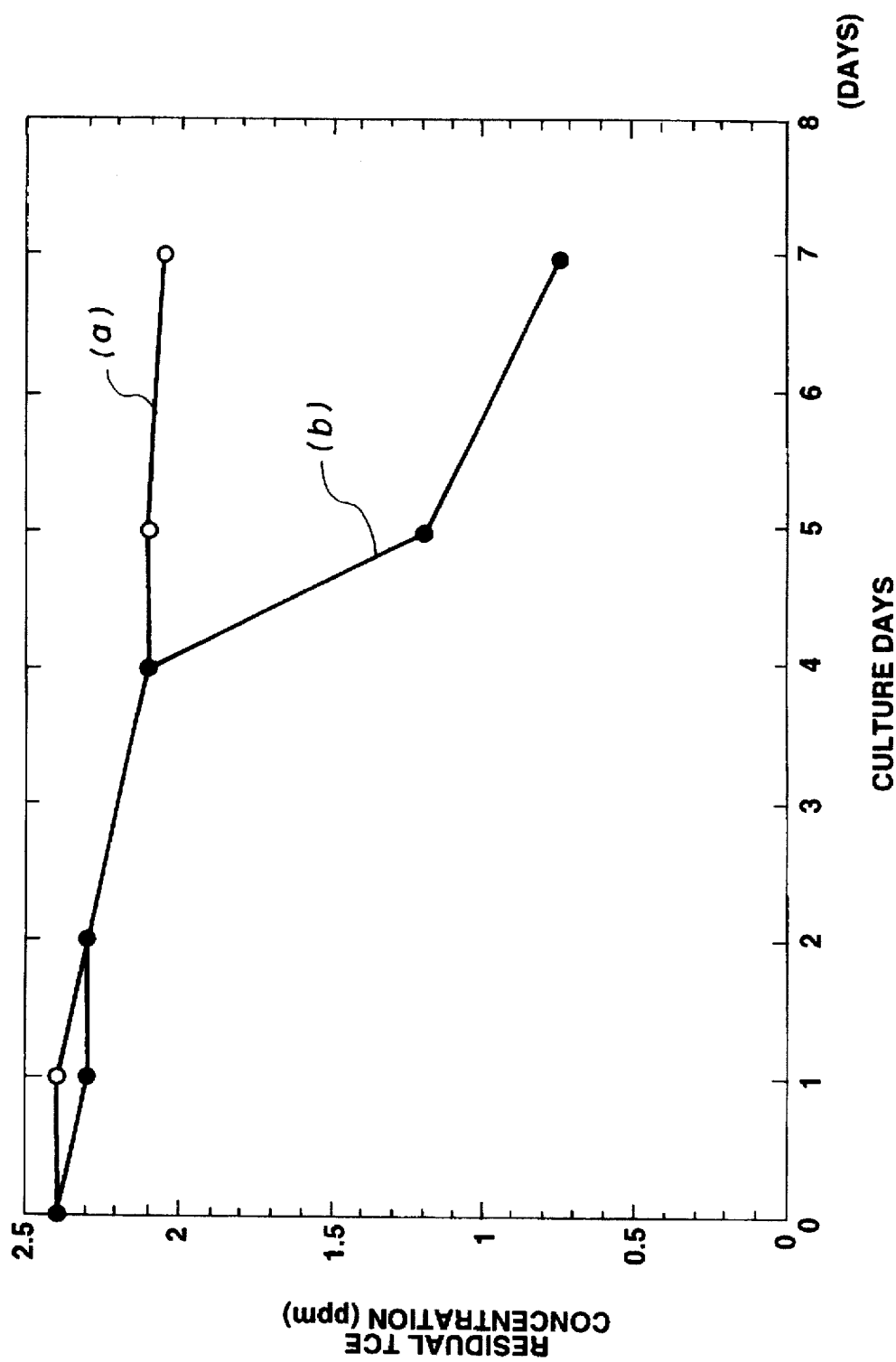

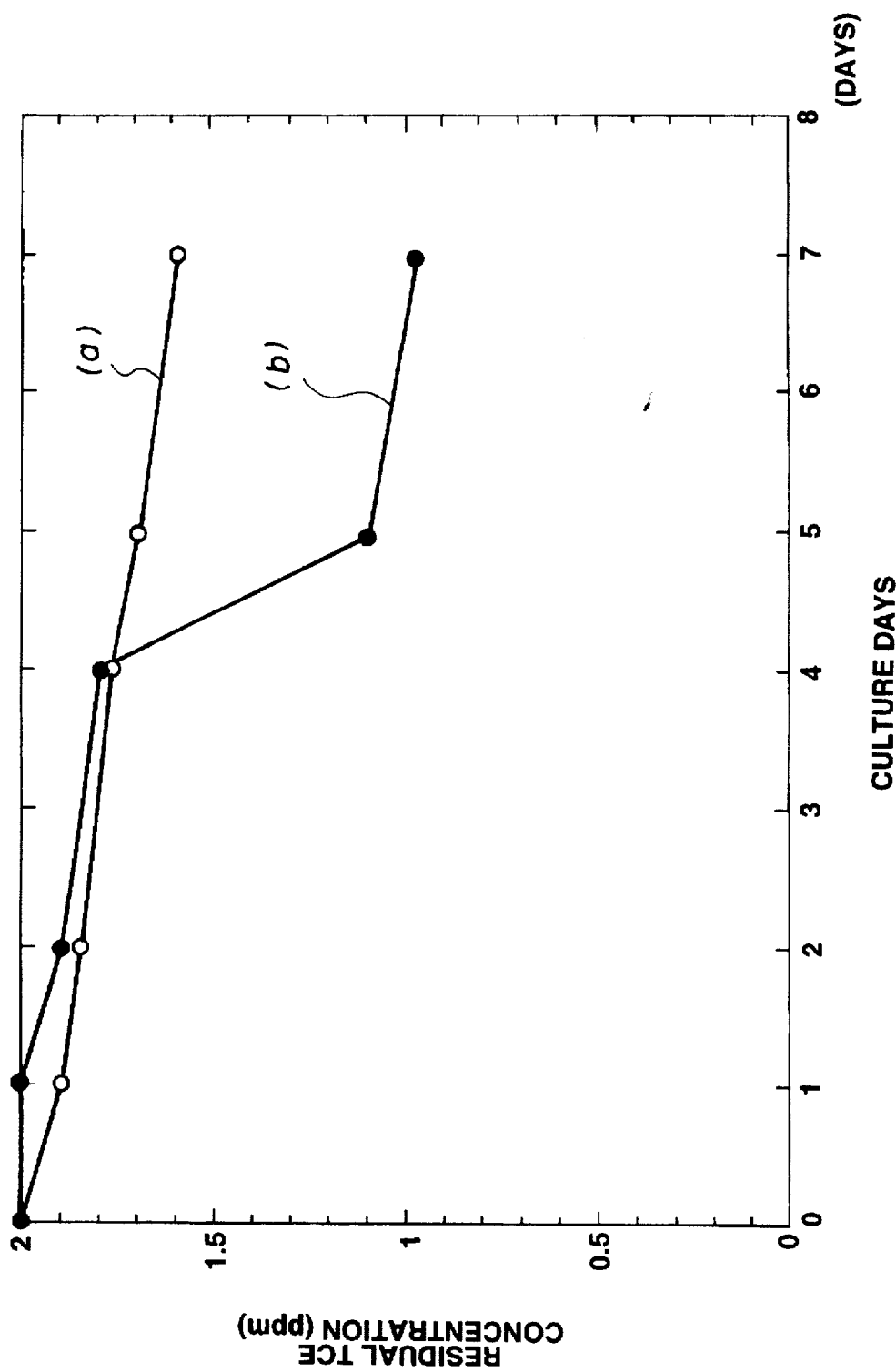

PROCESS FOR DECOMPOSING A CHLOROORGANIC COMPOUND WITH MICROORGANISM AND PROCESS FOR REMEDYING ENVIRONMENT WITH MICROORGANISM

BACKGROUND OF THE INVENTION

1. Field of the Invention

The present invention relates to a process for decomposing a chloroorganic compound using a microorganism which can decompose said compound. In particular it can provide a process for decomposing the chloroorganic compound safely and easily by inducing the microorganism to decompose said organochlorine compound by exposure of said microorganism to a harmless naturally occurring compound. The present process can be used to upgrade an open environment polluted with a chloroorganic compound. It is therefore applicable to the disposal of an effluent or treatment of soil to reduce the content of chloroorganic pollutants.

2. Related Art

In recent years, environmental pollution by chloroorganic compounds which are harmful to living organisms and are difficult to decompose has become a major problem. In particular soil around paper and pulp manufacturing plants or around industry that uses precision machines has become prone to pollution with chloroorganic compounds, such as tetrachloroethylene (PCE), trichloroethylene (TCE) and dichloroethylene (DCE). Pollution with such compounds has been found sometimes to have become spread over a wide area, and these compounds are detected in many environemntal surveys. Chloroorganic compounds persist in soil and become dissolved in groundwater as rain falls on the polluted sites, which further increases the effect of the pollution. Because organochlorine compounds are quite stable in the environment, pollution of groundwater which is used as a source of drinking Water has become a health problem.

Various methods have been put forward for removing chloroorganic compounds from process streams in industry. For example, an absorption disposal method using activated carbon has been suggested, and it has also been suggested to decompose organochlorine compounds using heat or radiation. However, these methods are too costly to be practical.

In recent years, it has been reported that the volatile chloroorganic compounds, such as TCE etc, which are stable under environmental conditions can be decomposed by a microorganism, and research aimed at developing a practical process using a microorganism has been carried out. The decomposition of a chloroorganic compound requires the microorganism to be exposed to a compound (hereinafter called an "inducible" compound) which induces it to make the enzyme oxygenase, the presence of that enzyme in the microorganism also giving the microorganism the capacity to decompose the chloroorganic compound. About a dozen different species of bacteria have been discovered and isolated which can decompose chloroorganic compounds, and these can be classified into two large groups, one of which is methanotropic bacteria or methane-using bacteria and the other is aromatic compound—using bacteria.

Representative examples of methanotropic bacteria include *Methylocystis* sp. strain M which can express methane monooxygenase. [Agric. Biol. Chem., 53, 2903 (1989); Biosci. Biotechn. Biochem., 56,486 (1992); ibid, 56,736 (1992)]; and *Methylosinus trichosprium* OB3b [Am. Chem. Soc. Natl. Meet. De v. Environ. Microbiol., 29, 365 (1989); Appl. Environ. Microbiol., 55, 3155 (1989); Appl. Biochem. Biotechnol., 28, 877 (1991)].

Representative examples of aromatic compound-using bacteria include *Acinetobactor* sp. strain G4 which can express toluene monooxygenase. [Appl. Environ. Microbiol., 52, 383 (1986); ibid. 53, 949 (1987); ibid. 54, 951 (1989); ibid. 56, 279 (1990;) ibid. 57, 193 (1991)] and also *Pseudomonas mendocina* strain KR-1 [Bio/Technol., 7, 282 (1989)] and further includes *Pseudomonas putida* strain F1 which can express toluene dioxygenase [Appl. Environ. Microbiol., 54, 17 03 (1988) ibid. 54, 2578 (1988)].

As described above, various strains of bacteria have been separated and identified that can decompose TCE. Disposal of TCE by decomposition using a microorganism, has some merits. No special chemical is necessary and the labor required to carry out the process is not great. However, species which exhibit a high TCE decomposition activity require the presence of e.g. methane, toluene or phenol as the inducible compound. However, these compounds are harmful and dangerous, and therefore they are unsuitable for use in the elimination of TCE in an open system, such as in polluted soil etc, which is a major obstacle to the use of microorganisms for such decomposition purposes. In particular, an aromatic compound, such as phenol or toluene is effective as the inducible compound for oxygenase which is a necessary enzyme for decomposing TCE. However, the aromatic compound itself is a compound which pollutes the environment so it is not an acceptable practice to treat soil with this material. Methane is an alternative inducible compound for oxygenase in some species of bacteria. However, methane is an inflammable gas so its use is complicated and difficult to control and cannot provide the basis of a practical soil treatment.

To alleviate these problems, Nelson et al has proposed in U.S. Pat. No. 5,071,735 a process in which TCE is decomposed using an aromatic amino acid, such as tryptophan, as the inducible compound. It has the advantages that it is harmless and is not gas, but aromatic amino acids, such as tryptophan are very expensive, and where they are dispersed into a polluted environment they are easily decomposed by a native microorganisms so the efficiency of the process is low.

Furthermore, where a foreign bacterium such as a TCE-decomposing bacterium is introduced into a natural environment such as soil or groundwater, the microorganism has to compete with the native microorganisms and its survival is threatened. It has to compete for a habitat and nutrients with Eumycetes and other bacteria, and it is subject to predation by protista. Thus, where a specific microorganism which decomposes the intended organochlorine compounds is introduced into the natural environment, it has to be protected from competition with the native microorganisms.

SUMMARY OF THE INVENTION

In view of the above problems, an object of the present invention is to provide a process which can decompose chloroorganic compounds safely and easily using an inducible compound which promotes the decomposition ability of the microorganism, and which compound is harmless and easy to obtain and is sufficiently stable in the environment where the decompositiion reaction is to be carried out. Such environments may include waste fluid, polluted soil and other open systems.

According to an aspect of the present invention, there is provided a process for decomposing a chloroorganic compound with a microorganism, comprising the steps of:

providing a microorganism which can decompose a chloroorganic compound by inducement with an aromatic compound;

bringing the microorganism into contact with a water-soluble material extracted from a plant having lignocellulose or with p-coumaric acid which activates the ability of the microorganism to decompose the chloroorganic compound; and decomposing the chloroorganic compound using the activated microorganism.

According to another aspect of the present invention, there is provided a process for purifying a material or locus polluted with a chloroorganic compound, which process comprises decomposing the chloroorganic compound in the material or locus by means of the above mentioned decomposition process.

BRIEF DESCRIPTION OF THE DRAWINGS

FIG. 6 is a graph which shows decomposition of TCE with strain KK01 and p-coumaric acid in fine sand as described in Example 11. The curve (a) shows the change of TCE concentration of a sample containing only strain KK01. The curve (b) shows the change of TCE concentration of a sample containing strain KK01 and p-coumaric acid.

FIG. 7 is a graph which shows decomposition of TCE with a native bacterium and p-coumaric acid in fine sand as described in Example 12. The curve (a) shows the change of TCE concentration of a sample containing a native bacterium. The curve (b) shows the change of TCE concentration of a sample containing a native bacterium and p-coumaric acid.

DETAILED DESCRIPTION OF THE PREFERRED EMBODIMENTS

Figure 1:
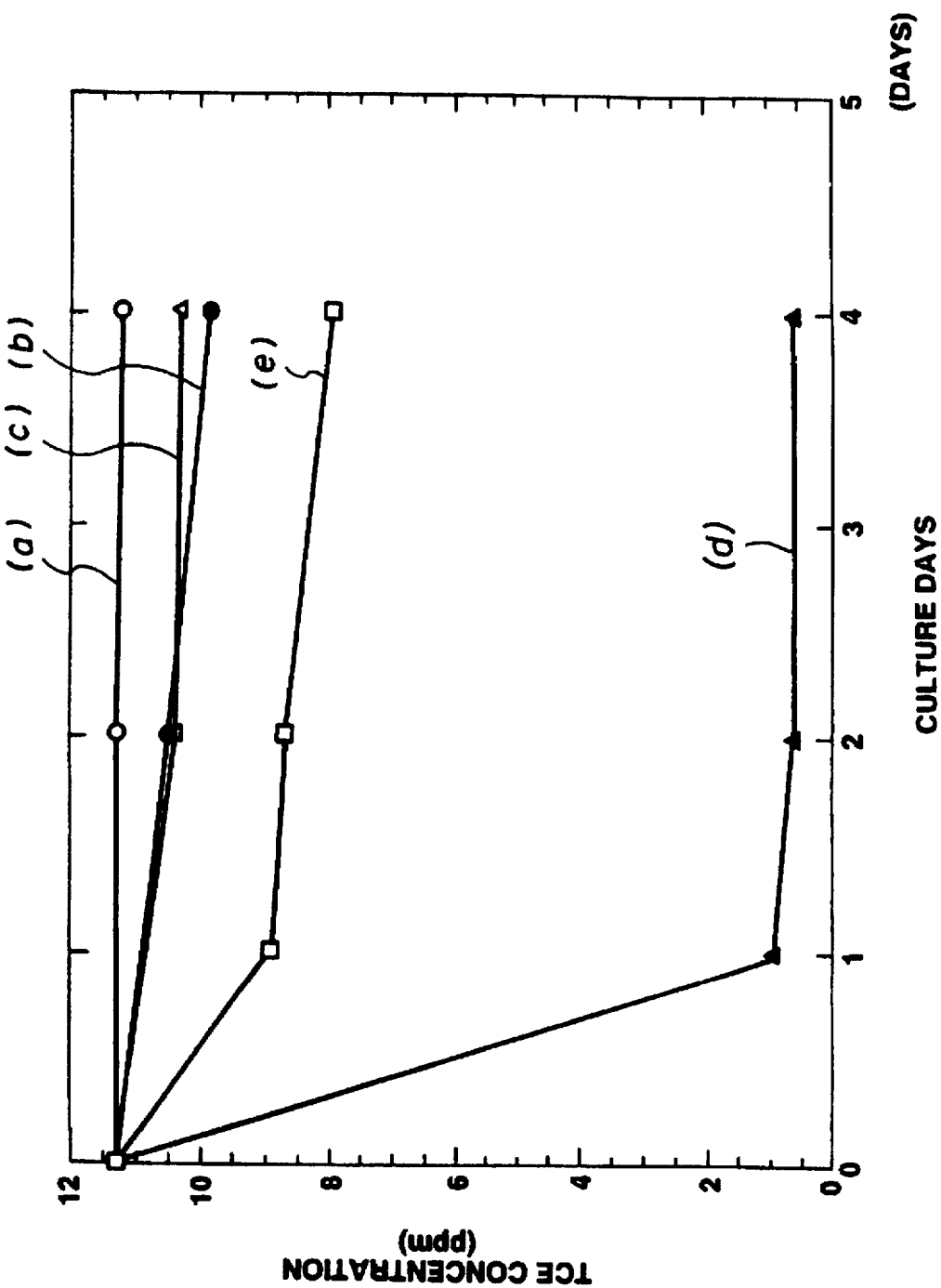
FIG. 1 is a graph which shows the relation between culture days and concentration of TCE when a strain KK01 is cultured in a medium containing liquid extracted from bagasse etc. which had been added as described in Example 3. The curve (a) shows the change of TCE concentration of a blank sample, not containing inducible compounds and any bacteria. The curve (b) shows the change of TCE concentration of a sample in which only bacteria were added. The curve (c) shows the change of TCE concentration in a sample in which bacteria and sodium glutamate were added. The curve (d) shows the change of TCE concentration of a sample in which bacteria and phenol were added. The curve (d) shows the change of TCE concentration in a sample in which bacterium and liquid extracted from bagasse were added.

The water soluble material used in the present process may be derived from a plant containing lignocellulose, of which there is a wide range including woody and herbaceous plants. Preferred sources of plant material are those which are readily available as by-products of argiculture and for which there is no existing use or which are in overproduction. Representative of plants that can provide lignocellulose include agricultural by-products such as bagasse, canetop, rice straw, corncob meal, bran, tobiko, bean-curd refuse, wood waste etc. Bagasse is a by product of the refining of sugar cane after the sugar liquid has been squeezed out, and canetop is an upper part of sugar cane. The only existing uses for these materials are fuel and feed for domestic animals so much of these materials goes to waste. Apart from being inexpensive and in bulk supply, these materials are harmless and can be added to or decomposed on soil without giving rise to environmental problems. The preferred sources of lignocellulose are herbaceous plants such as grasses. The ability of these plants to activate a microorganism in organochlorine decompsoition is higher than that of other plants containing lignocellulose. Rice straw, bagasse and canetop etc. have been found to be particularly effective.

An extract from the above lignocellulose-containing plants make a specific microorganism develop an enzyme which bring about decomposition of a chloroorganic compound (oxygenase). Such an inducible compound is soluble, and can be obtained from the plants by extracting with water. It is believed that the naturally occurring materials of living plants are transformed in the extraction process so the structure of the extracted derivable material is slightly different from its structure in the plant. The material extracted from brown forest soil which is humus containing dead plant material including extractable lignocellulose does not give rise on extraction with water to a material which can promote the microbial decomposition of organochlorine compounds by the method of the invention. Thus it is not believed that the present process happens naturally in the environment as a result of contact of the inducible compound with any native microorganism which can decompose a chloroorganic compound in the soil.

The inducible compound extracted from plants as discussed above is believed to be an unusual material which exhibits particular desirable properties in the present process. We have investigated the relation between the liquid extracted from the plant by various extraction methods and the ability of a microorganism to decompose a chloroorganic compound. Lignin which is soluble in water and of low molecular weight and can be detected together with cellulose so it appears that a compound in which lignin and cellulose are complexed or combined changes into soluble inducible compound. An inducible compound cannot be detected in a liquid extracted from a plant which is low in lignin.

The extraction process for the inducible compound may use any processes which can convert lignocellulose in a plant to a low molecular weight compound which is soluble in water. Representative methods include immersion of the plant material in water at high temperatures, high pressure water extraction, extraction with water and simultaneous exposure to microwaves, and extraction with aqueous alkali. For example, the inducible compound may be extracted from the plant material by immersion in 5–50 times, particularly 10–30 times of the plant's weight of distilled water. The temperature may be 100°–250° C. particularly 150°–210° C., and the pressure may be 0.05–5 MPa, particularly 0.1–3 MPa, and the time may be 10–60 minutes, particularly 15–30 minutes. In the process in which plant material is extracted with water by operating with microwaves, the compound may be extracted with 5–50 times, preferably 10–30 times, of the plant's weight of distilled water and irradiating with 0.5–2 kw per 100 ml, preferably 0.8–1.7 kw per 100 ml, (frequency 900–2500 MHz). In an alkali extraction process, the compound may be extracted using 5–50 times, particularly 10–30 times of the plant's weight of 0.1–1M NaoH or KOH solution (pH 11–12) for a period of 10–60 minutes, preferably 30–60 minutes and with stirring. Furthermore a combination of the above extraction processes in which alkali extraction and at least one other extraction method are carried out is preferably used because it has been found to be particularly efficient.

Furthermore, where the environment contains only slight amounts of the microorganism to be controlled, it may be sufficient to break up plant material containing lignocellulose by means of a vibratory ball mill into pieces of diameter some tens of μm, and introducing the finely divided plant material and a bacterium for decomposing the chloroorganic compound to the locus containing the organochlorine compound to be decomposed. The inducible compound is eluted from the finely divided plant material by rainwater etc., and the inducible compound comes into contact with the bacterium to bring about decomposition of the pollutant. In this case, however, the structure of the inducible compound is not changed so much as in the extraction processes described above, and finely divided plant material is preferably used only where the concentration of the chloroorganic compound is quite low.

Existence of the water-soluble lignocellulose can be detected by confirming the presence of lignin by means of a fluoroglucin hydrochloric acid reaction, a Maule reaction or Cros-Bevan reaction etc. and by confirming the presence of cellulose by means of colour reaction with phenol and sulphuric acid. In the extracted liquid the solids content may preferably be 5–20%, particularly 10–15% by weight.

The inducible compound in the extracted liquid obtained by the above methods is not an aromatic amino acid. However, it has surprisingly been found that an inducible compound which is an aromatic compound but not an aromatic amino acid potentiates a microorganism which up to now has only been known to decompose a chloroorganic compound by inducement using an aromatic compound. For example p-coumaric acid exists in herbaceous plants such as grass etc. and forms part of the basic skeleton of lignin in the plant. In leaves of plants of the eucalyptus family e.g. the manna rubber tree or leaves of a grassy plant, such as *Echinochloa crusgalli*, it is a quite normal secondary metabolite. p-Coumaric acid has been found to be an effective compound and is less expensive than an aromatic amino acid. Because protista in the environment find it hard to attack p-coumaric acid, it is a relatively stable material in the present environment. Furthermore, p-coumaric acid acts as an allelochemical and avoids the development of protista, and it can be converted in situ to p-hydroxystyrene which has strong antifugal activity by a specific microorganism having a decarbonization enzyme. [Gendai Kagaku (Modern Chemistry) 1993, August, pages 24–35 and 36–41)].

Generally, in decomposition of p-coumaric acid by a microorganism, there are two pathways involving production of 3,4-dihydroxy cinnamic acid. One pathway involves hydroxylation of the meta-position of p-coumaric acid to give 3,4-dihydroxy cinnamic acid followed by ring-opening. The second pathway involves oxidation of the side chain of p-coumaric acid firstly to produce p-hydroxybenzaldehyde, after which the p-hydroxybenzaldehyde is converted to p-hydroxy benzoic acid which then undergoes a ring opening reaction. In either pathway, oxygenase participates in the step in which p-coumaric acid is converted to 3,4-hydroxycinnamic acid. In addition, oxygenase promotes a reaction in which chloroorganic compounds, such as TCE, DCE are decomposed to harmless compounds. Thus, by bringing a microorganism which can express oxygenase into contact with p-coumaric acid, p-coumaric acid activates the ability of the microorganism to decompose chloroorganic compounds. Furthermore, in the microbial decomposition of p-coumaric acid, compounds which are known to induce the microorganism to express oxygenase such as phenol, toluene or cresol are not produced. It is therefore apparent that the present mode of stimulating the microorganism to express oxygenase is different from the known methods for making microorganisms express oxygenase such as exposure to a phenolic compound.

Any microorganism may be used in which decomposition of chloroorganic compounds can be induced by inducible compounds of aromatic-type, i.e., microorganisms which can express oxygenase. Such microorganisms can be used even where they have not been identified and/or separated and even where they are living together with other microorganisms. Representative microorganisms belong to the Pseudomonas, Xantobacter or Acinetobacter genus etc. particularly, *Pseudomonas ptuida*, *Pseudomonas fluorescens* and *Pseudomonas aeruginosa*. In particular there may be mentioned *Pseudomonas cepacia* strain KK01 (herein referred to as strain KK01) which has been separated from a bowl of *Nasuti termes* (FERM BP-4235) and *Pseudomonas putida* strain BH (which has been separated from phenol acclimated activated sludge see GESUIDOKYOKAISI (Waste water society journal); vol. 24, No. 273, pp 27–33 (1987); Wat. Res., vol. 27, No. 1, pp 9–13 (1993)) which may preferably be used.

When using a native bacterium, the desired bacterium can be obtained by investigating its ability to decompose a chloroorganic compound with the selected medium. The above extracted liquid or p-coumaric acid may be added in an amount of about 0.5–100 mg, preferably 3–60 mg as solid material to $10^7$ cells of the above microorganism. Where less is added the effect of the inducible compound is not sufficient and where an excess is added, the effect may be reduced which is detrimental.

In the extracted liquid, the water soluble lignocellulose is comparatively difficult for microorganism to decompose except where the microorganism can also decompose a chloroorganic compound. The water soluble lignocellulose can therefore efficiently and reliably activate the microorganism's ability to decompose the desired chloroorganic compound. The amount of the microorganism to be added can be regulated according to its decomposition ability. However, the amount is preferably about $10^5$–$10^9$ cells, particularly $10^7$–$10^8$ dells, to 1 ppm of a chloroorganic compound to be decomposed. Where the amount is less, the chloroorganic compound is insufficiently decomposed, and although there is no actual upper limit the above range is practical.

The above microorganism develops the ability to decompose a chloroorganic compound when exposed to an aromatic compound. Its ability can be increased without the need to supply the aromatic compound during the decomposition process by culturing the microorganism in a culture medium to which the aromatic compound has previously been added. As conditions for the pre-culture, for example, the microorganism may be cultured by shaking for 12–15 hours at 30° C. in a medium containing 100 ppm of phenol and 0.2% of sodium glutamate per $10^7$ cells of bacterium. In the culture liquid resulting from the pre-culture step, the residual aromatic compound is only 0.001 ppm or less. Therefore, where this liquid is applied to an environment it does not itself give rise to significant pollution, and living creatures in the environment are not harmed. Where pre-culture is carried out using the microorganism and the above extracted liquid or p-coumaric acid as the inducible compound, the microorganism's ability to decompose organochlorine compounds can be further increased.

No special procedure is required for bringing the microorganism into contact with the water soluble material or p-coumaric acid. For example, the microorganism can be brought into contact with the water soluble material by dispersing the microorganism into the environment to be remedied, and adding the water soluble material which diffuses into contact with it. The microorganism is preferably brought into contact with the water soluble material before decomposition of the chloroorganic compound, and/or while decomposition of the chloroorganic compound is taking place, particularly, at least during decomposition of chloroorganic compound.

The chloroorganic compounds which can be decomposed by the present process include chlorinated hydrocarbon, particularly, chlorinated ethylenes, such as TCE, DCE and PCE. In particular it is applicable to TCE and DCE so that the present invention is useful for upgrading of polluted environments. As to the concentration of the chloroorganic compound in the environment to be upgraded by the present process, for example, a polluted environment which contains 0.5–5 ppm of TCE may be remedied.

In the above process for decomposing a chloroorganic compound, a harmful compound or dangerous compound is not used as the inducible compound, so that most closed or open systems, such as disposal of waste water or disposal of soil, or polluted environments can be upgraded. In the above case, the decomposition with a microorganism to upgrade the environment can be done reliably by supporting the microorganism and the water soluble element on a carrier. Further, the decomposition can be done efficiently by using various processes which also have the effect of promoting growth of the relevant microorganism.

A carrier suitable for the above purpose may be a material having a large surface area on which an aerobic microorganism can be absorbed. The TCE-decomposing bacteria such as *Pseudomonas cepacia* and *Pseudomonas putida* may be supported in an active state when absorbed on the surface of a carrier having a large surface energy and which can easily be imparted with a postive electrical charge, and which has a porous structure or a three-dimensionally crosslinked structure. Supporting the microorganism avoids predation by protozoa in the soil. Representative examples of carriers may include inorganic materials, such as porous ceramics, porous glass, calcium silicate, silica and aggregated structured soil particles like kanuma soil, active carbon; organic materials, such as urethane foams, anion-exchange resins, cellulose, lignin, chitin and chitosan. A carrier having a three-dimensionally crosslinked structure may contain a known material which can form the three-dimensionally crosslinked structure, such as polycarbonate, polymethylmethacrylate, fluoro-vinylidene type polymer, fluoropolymer, such as Teflon, nitro-cellulose, cellulose acetate, polyolefin type polymer, polyvinylachohol type polymer and polyurethane type polymer. The three-dimensional network structure is obtained, for example, by uniaxial or biaxial stretching, solvent evaporation from a solvent separation film, blending and molding with a filler like silica and subsequent extraction of the filler to form fine pores. Further, the microorganism and/or the water soluble element may be dispersed in a solution or gel-like compound which is encapsulated in a microcapsule, and a carrier having a porous structure and containing a solution or gel-like compound inside may be used. Representative examples of the gel-like compound may include water soluble synthetic polymers and their derivatives, such as polyacrylamide, polyvinylalcohol, polyvinylpyrroidone and polyacrylic acid etc. and a compound in which a water soluble natural polymer, and its derivatives, such as cellulose, gum arabic, carrageenin, gelatin, pectin and sodium alginate, is swelled with water, and a nutriment, a compound required by the bacterium may be added.

Where it is a problem if the microorganism and carrier introduced into soil remain in the soil after the treatment, the carrier may preferably be made of biodegradable polymer, such as bacterial cellulose, a film or formed compound of a complex of cellulose and chitosan, microorganism polyester, polylactic acid, polylactone, polyglyoxylic acid, polymalic acid, starch added plastic, polycaprolactone, (hydroxybutyric acid)—(hydroxyvaleric acid) copolymer, polyamine acid, polysaccharide polymer. Then the carrier can be decomposed by the microorganisms which it carries or by a native microorganism in the soil so the problem can be resolved. Further, in this case, the material and form of the carrier may preferably be selected so that the carrier is decomposed with the soil disposal, or after the soil disposal.

Where the carrier is made of a substrate which is a nutrient for a microorganism carried by the carrier, the existence and activity of the microorganism can be promoted. Representative examples thereof may include a compound which can be a source of carbon or nitrogen for the microorganism, inorganic compounds and micro-nutrients, such as vitamins. The amount of the microorganism carried depends on a material of the carrier, the effective area of the carrier and character of the microorganism, and is generally in the range of from $10^4$ to $10^9$ cells to 1 g of the carrier.

As described above, according to the present invention, an inducible compound is selected from compounds which are inexpensive, which can be obtained easily and which come from natural compounds. Therefore, in the disposal of waste water and disposal of soil etc., particularly in the open disposal system, previous restrictions can be sharply reduced.

EXAMPLES

Hereinbelow particular embodiments the present invention will be explained in more detail with reference to the Examples, and in each example M9 medium has a composition described below.

M9 medium composition (per liter)

Na$_2$HPO$_4$: 6.2 g
KH$_2$PO$_4$: 3.0 g
NaCl: 0.5 g
NH$_4$Cl: 1.0 g
H$_2$O: rest
(pH 7.0)

The concentration of TCE or DCE was measured by headspace—gas chromatography. That is, 15 ml of M9 medium which was made to be a desired concentration of TCE or DCE and 100 µl of liquid containing bacteria (6×10$^7$ cells) was introduced into a 50 ml volume serum bottle, and the serum bottle was sealed by a butyl rubber stopper and an aluminium crimp cap. The bacteria were cultured by the shaking culture method (120 rpm) at 30° C. Thereafter 0.1 ml of the gas phase was sampled for analysis by a gas chromatograph.

The liquid containing bacteria was prepared according to a process by which a colony on an agar medium was cultured by the shaking culture method in a M9 medium containing 0.2% of sodium glutamate and 0.05% of yeast extract at 120 rpm 30° C. for 24 hours.

The existence of water soluble lignocellulose in a extracted liquid was confirmed by testing for the presence of lignin and cellulose in the extracted liquid. The existence of lignin was confirmed by a reaction of fluoroglucine and hydrochloric acid, and the existence of cellulose was confirmed by colour development of phenol and sulphuric acid reaction. In addition, the amount of water soluble lignocellulose can be known relatively by comparing the Colour development. Further, an amount of solids in the extracted liquid was provided by comparing dry weight before the extraction and dry weight after the extraction.

Example 1
Extract of an inducible compound 5 samples including an inducible compound were prepared as follows:

(1) 10 g of bagasse or rice straw was added into 100 ml of distilled water, and it was autoclaved at 120° C., 0.1 PMa for 10 minutes. The extracted liquid was filtrated to obtain 89 g of sample. The amount of solids in the sample from extracted liquid of bagasse was 11%, and the amount of solids in the sample from extracted liquid of rice straw was 10.5%. The existence of water soluble lignocellulose was confirmed by the colour development.

(2) 10 g of bagasse or rice straw was added into 100 ml of distilled water, and it was irradiated with microwaves using an oven (0.8 kW, 2450 MHz) for 10 minutes. Thereafter the extracted liquid was filtrated to give 93 g of sample. The amount of solids in the sample from extracted liquid of bagasse was 13.5%, and the amount of solids in the sample from extracted liquid of rice straw was 12%. The existence of water soluble lignocellulose was confirmed by the colour development.

(3) 10 g of bagasse or rice straw was added into 100 ml of 1M-sodium hydroxide aqueous solution, and it was stirred for 1 hour. Thereafter the extracted liquid was filtrated to obtain 101 g of sample. The amount of solids in the sample from extracted liquid of rice straw was 10%, and the existence of water soluble lignocellulose was confirmed by the colour development.

(4) 10 g of bagasse or rice straw was added into 100 ml of 1M-sodium hydroxide aqueous solution, and it was autoclaved at 102° C., 0.1 MPa for 10 minutes. Thereafter the extracted liquid was neutralized with sulphuric acid, and it was filtered to obtain 108 g of sample. The amount of solids in the sample from extracted liquid of bagasse was 14.5%, and the amount of solids in the sample from extracted liquid of rice straw was 14%. The existence of water soluble lignocellulose was confirmed by the colour development.

(5) 10 g of bagasse or rice straw was added into 100 ml of 1M-sodium hydroxide aqueous solution, and it was irradiated with microwave using microwave oven (0.8 kW, 2450 MHz) for 10 minutes. Thereafter 200 ml of distilled water was added to the extracted liquid, and it was neutralized with sulphuric acid. Thereafter the extracted liquid was filtrated to obtain 99 g of sample. The amount of solids in the sample from extracted liquid of bagasse was 14.5%, and the amount of solids in the sample from extracted liquid of rice straw was 14%. The existence of water soluble lignocellulose was confirmed by the colour development.

It was estimated that the amount of water soluble lignocellulose in the extracted liquids obtained from the above (1)–(5) processes was larger (4), (5), (2), (1), (3) in this order according to the degree of the colour development. Furthermore, in case of using the above processes (3), (4) and (5), it was investigated whether phenol was produced. However, it was reported that the possibility which phenol was produced was quite low even in a step of sodium digestion (digested with about 20% of caustic soda at 160° C.), one of the steps which removes lignin in pulp producing process (see "LIGNIN NO KAGAKU (CHEMISTRY OF LIGNIN") edited by JUNZO NAKANO, published by YUNI-SHUPPAN, pp 250–259). Thus it was not considered that phenol is produced by the processes (3), (4) and (5) in which conditions are weaker than that of a sodium digestion step, so that the influence of phenol can be ignored.

Decomposition of TCE with Strain KK01

100 µl of strain KK01 (FERM BP-4235) was added to 5 samples of M9 medium (15 ml) which contained 100 µl of extracted liquid from bagasse and rice straw obtained by the process of (1), (2), (3), (4) or (5), and the decomposition of TCE was evaluated. The remaining TCE concentration after 3 days culturing is shown in Table 1. The results which appear in that table show that the extracted liquid from bagasse and the extracted liquid from rice straw contain the inducible compound for the decomposition of TCE. Further, TCE was added to M9 previously to be about 7 ppm of initial concentration.

TABLE 1

The influence of each extract on the decomposition with Strain KK01

| | CONCENTRATION | | | |
|---|---|---|---|---|
| | Bagasse | | Rice Straw | |
| No. | Initial | Residual | Initial | Residual |
| 1 | 7.2 (ppm) | 6.0 (ppm) | 6.8 (ppm) | 6.0 (ppm) |
| 2 | 7.3 | 5.3 | 7.0 | 6.0 |
| 3 | 7.0 | 4.3 | 6.9 | 5.2 |
| 4 | 7.2 | 3.0 | 7.1 | 5.0 |
| 5 | 7.0 | 3.1 | 7.1 | 4.4 |

Example 2
Decomposition of TCE with Strain KK01

Strain KK01 was added to M9 medium (15 ml), in which a range of 200–5000 µl of bagasse extracted liquid obtained according to the process of (5) in the Example 1 was added. The strain KK01 was cultured, and its effect on the decomposition of TCE was evaluated. The remaining TCE concentration after 3 days culturing was shown in Table 1. Further, TCE was added to M9 previously to be about 11 ppm of the first concentration.

The above results show that the bagasse extracted liquid obtained by the process (5) in Example 1 has an effect on the decomposition of TCE in the range of 1/75–1/7.5 of volume ratio (bagasse extracted liquid/medium), or in terms of the ratio of solids amount in the extracted liquid (g) to the number of bacteria present in the range of 30 µg/$10^7$ cells—300 µg/$10^7$ cells.

TABLE 2

The influence of baqasse extract's amount on the decomposition with Strain KK01

| (µl) | remained TCE concentration (ppm) |
|---|---|
| 0 | 11.5 |
| 200 | 5.3 |
| 500 | 8.7 |
| 1000 | 8 |
| 2000 | 9.2 |
| 5000 | 12 |

Example 3

Decomposition of TCE with Strain KK01

Sodium glutamate (0.2%), phenol (10 ppm) and the extracted liquid from bagasse (200 µl/15 ml), which was obtained in the same manner as the process (5) in example 1, were each separately added to 15 ml of M9 medium, and then the bacterium liquid was added to each M9 medium. A blank M9 medium and an M9 medium containing only the bacterium were also prepared. The bacteria were then cultured and the influence of the additives on the decomposition of TCE with strain KK01 was evaluated. The results were shown in FIG. 1.

In the system added with phenol, TCE with an initial concentration of 11.3 ppm was decomposed to 0.6 ppm two days later. And in the system added with the extracted liquid of bagasse, TCE with the initial concentration of 11.3 ppm was decomposed to 9 ppm two days later. Although the effect on the decomposition of TCE for extracted liquid bagasse was not as effective as phenol, it was apparent that the extracted liquid from bagasse operated on the decomposition of TCE and was an inducible compound.

Example 4

Decomposition of TCE with Strain KK01 which was pre-cultured with phenol

Figure 2:
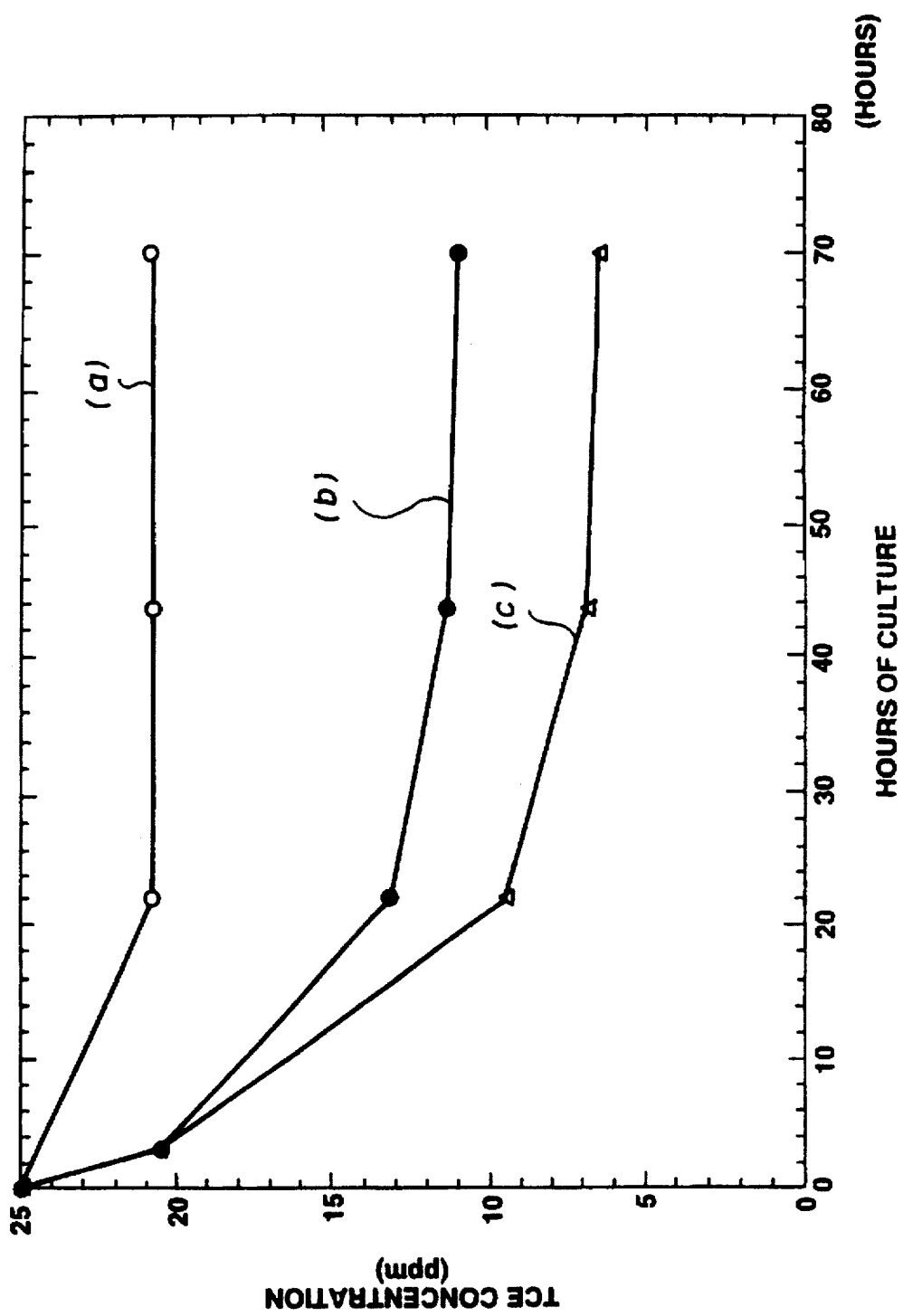
FIG. 2 is a view which shows the relation between culture days and concentration of TCE when a strain KK01 is cultured in a medium where alkaline liquid extracted from bagasse etc. had been added as described in Example 4. The curve (a) shows the change of TCE concentration of a blank sample without any inducible compounds. The curve (b) shows the change of TCE concentration of a sample in which only liquid containing strain KK01 previously cultured with phenol was added. The curve (c) shows the change of TCE concentration of a sample where both a strain KK01 previously cultured with phenol and alkaline extracted bagasse were added to the liquid.

Strain KK01 was cultured on the M9 medium including 100 ppm of phenol at 30° C. for 14 hours. Thereafter 100 µl of this bacterium liquid (4.0×$10^7$ cells) was added to 15 ml of a sample of M9 medium to which distilled water had been added and to another sample of M9 medium to which 200 µl of alkali extracted liquid from bagasse obtained as in Example 1 had been added (the initial concentration of TCE in the M9 medium was 25 ppm). A blank sample containing only M9 medium was also prepared. The influence of the extracted liquid from bagasse on the decomposition of TCE with strain KK01 which was pre-cultured with phenol was determined. The results are shown in FIG. 2. In this example, an inducing effect by phenol used in the pre-culture step operated on the sample to which distilled water had been added and the sample to which the extracted liquid from bagasse had been added during the initial one hour of culture. Thereafter an induced effect by the extracted liquid from bagasse was clearly apparent. TCE with an initial concentration was 25 ppm was decomposed to 6 ppm after 40 hours.

Example 5

Decomposition of DCE with Strain KK01

100 ml of Strain KK01 was added to M9 medium to which 200 ml of the extracted liquid of bagasse (5) had been added to evaluate decomposition of cis-1, 2-dichloroethylene and trans-1, 2-dichloroethylene in the same manner as in Example 1. The concentration of DCE after 3 days culture is shown in Table 3. According to this result, it is apparent that the extracted liquid also operated on decomposition of dichloroethylene.

TABLE 3

Influence of the extracted liquid on the decomposition of DCE with Strain KK01

| | initial concentration (ppm) | residual concentration (ppm) |
|---|---|---|
| cis-DCE | 10.9 | 6.2 |
| trans-DCE | 7.6 | 4.0 |

Example 6

Decomposition of TCE with *Pseudomonas putida* Strain BH

A sample of 100 ml (5.0×$10^7$ cells) of bacterial liquid was provided which contained *Pseudomonas putida* Strain BH [GESUIDO KYOKAISI (JOURNAL OF SOCIETY FOR DRAINAGE), 24 (273), 27–33, 1987] which is a bacterium for decomposing TCE. To the liquid was added the M9 medium containing 200 µl of extracted liquid from bagasse (5) to evaluate decomposition of TCE. The pH of the medium was adjusted to 7.6. TCE having an initial concentration was 8.3 ppm of decomposed to 4.9 ppm after 3 days culturing. By this result, it was shown that the extract of bagasse operated on decomposition of TCE with *Pseudomonas putida* strain BH.

Example 7

Decomposition of TCE with native bacterium

In soil which was subjected to a pollutant, such as TCE for long time, it is not unusual that there is a bacterium having resistance to the pollutant and an ability to decompose the pollutant because of selection pressure by the pollutant. 10 g of soil which had been polluted by TCE for scores of years and which contained about 0.1 ppm of TCE as detected by an elution test regulated by JIS (Japanese Industrial Standard) was added to 50 ml volume serum bottle. TCE aqueous solution was added to the bottle to give a 3 ppm TCE concentration. Calibration was done by adding TCE aqueous solution the concentration of which was known to the soil. Thereafter distilled water or the extracted liquid of bagasse was added to the serum bottles, and the bottles were sealed by a butyl rubber seal and aluminium crimp cap and were shaken at 120 rpm while the bacterium was cultured. The effect of the extracted liquid of bagasse on the decomposition of TCE with the native bacterium was evaluated in the sample to which the extract of bagasse had been added.

TCE of with an initial concentration of 5.0 ppm was decomposed to 2.1 ppm. The above results show that the extracted liquid of bagasse also operated on decomposition of TCE with a native bacterium.

In a further experiment, the ability to decompose TCE was developed in the native bacterium by the presence of phenol. There were 7 kinds of bacterium and about $10^9$ cells in 10 g of the soil.

Comparative Example 10 g of brown forest soil from which water soluble lignin has been eluted naturally by decomposition of plants was operated in the same manner as the process (5) in Example 1 to obtain an extract. The existence of water soluble lignocellulose in the extract was investigated by colour reaction described above. A little colour development was observed so it was confirmed that lignocellulose was present. Thereafter, the TCE decomposition test with strain KK01 was carried out using the extract in the same manner as in Example 1. TCE with an initial concentration of 5 ppm decreased only to 4.8 ppm. According to this result, it was apparent that the structure of lignocellulose was maintained. However, the structure of substituent etc. was different from that in the above examples. Thus, it was considered that the water soluble lignocellulose did not operate on the decomposition of TCE as an inducible compound.

Examples with p-coumaric acid (Examples 8–12)

In the following Examples there are was used an M9 medium which had composition described below.

M9 medium composition (per liter):
$Na_2HPO_4$ 6.2 g
$KN_2PO_4$ 3.0 g
NaCl 0.5 g
$NH_4Cl$ 1.0 g
$H_2O$ rest
(pH 7.0)

The concentration of the chloroorganic compound, such as TCE, in the liquid culture system was measured by headspace gas chromatography. That is, 5 ml of the M9 medium containing a desired concentration of TCE was introduced into 20 ml volume of serum bottle, and 100 ml of liquid containing bacteria were added into the bottle, after when the bottle was sealed by a butyl rubber stopper and aluminium crimp cap and was shaken at 30° C. for a desired time to culture the bacterium. Then 0.1 ml of gas phase was sampled and was measured by a gas chromatograph having an FID detector (trade name: SHIMADZU Gas chromatograph GC-14B). The concentration of the chloroorganic compound in the fine sand culture system was measured by n-hexane extracted gas chromatography. That is, 5 g of fine air-dried sand which the diameter was 2 mm or less was added into a 15 ml volume of serum bottle and having a screw cap backed with fluororesin (trade name: Teflon; mfd. by Du Pont). Deionized water (1 ml) containing TCE in the desired concentration and 0.1 ml of liquid containing a bacterium were added to the bottle, and the bottle was sealed and was left at 30° C. for the appropriate time to culture the bacterium. Thereafter, 5 ml of n-hexane was added to the bottle and the liquid in the bottle was stirred for 3 minutes using a vibroshaker. The hexane layer was measured by a gas chromatograph having ECD detector (trade name: SHIMADZU Gas chromatograph GC-14B). Further, the fine sand was sampled from sand which had been polluted for about 10–20 years at a depth of 6–10 m under the Kanto area of Japan.

Example 8

Figure 3:
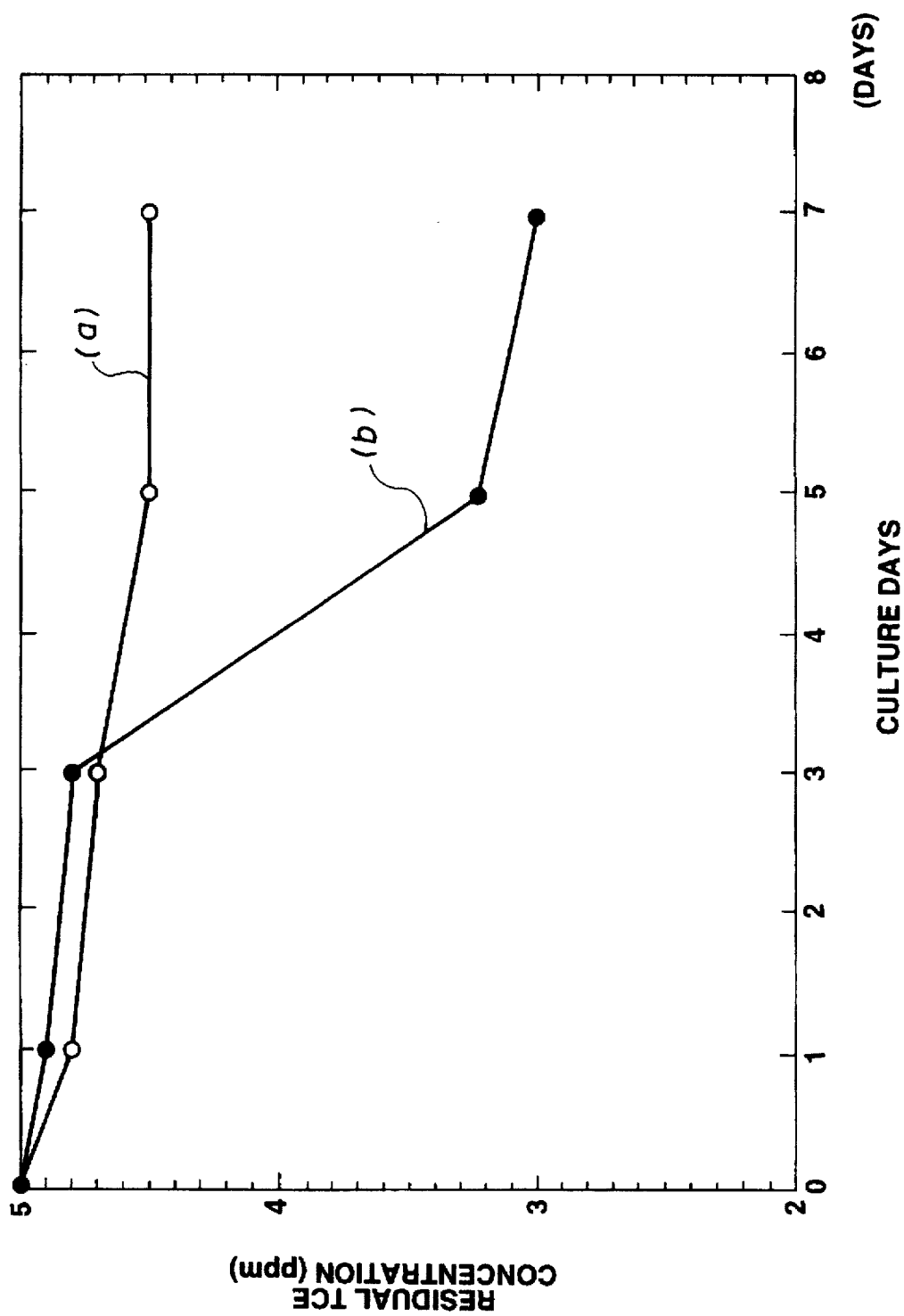
FIG. 3 is a graph which shows the decomposition of TCE with p-coumaric acid and strain KK01 as described in Example 8. The curve (a) shows the change of TCE concentration of a sample containing strain KK01 and sodium glutamate. The curve (b) shows the change of TCE concentration of a sample containing KK01 strain, sodium glutamate and p-coumaric acid.

Two serum bottles were provided containing M9 culture medium and containing TCE (4 ppm) described above. Sodium glutamate and p-coumaric acid were added to one of the bottles to give 0.2% of sodium glutamate concentration and to give 100 ppm of p-coumaric acid concentration. Only sodium glutamate (0.2%) was added to the other bottle. Strain KK01 was cultured in the 2 kinds of medium and the change of TCE concentration was observed. The result was shown in FIG. 3 from which it is apparent that in the system to which p-coumaric acid was added, decomposition of TCE was notable after 3 days culture compared to the system which p-coumaric acid was not added, and TCE was decomposed to 3 ppm after 7 days culture.

Example 9

Figure 4:
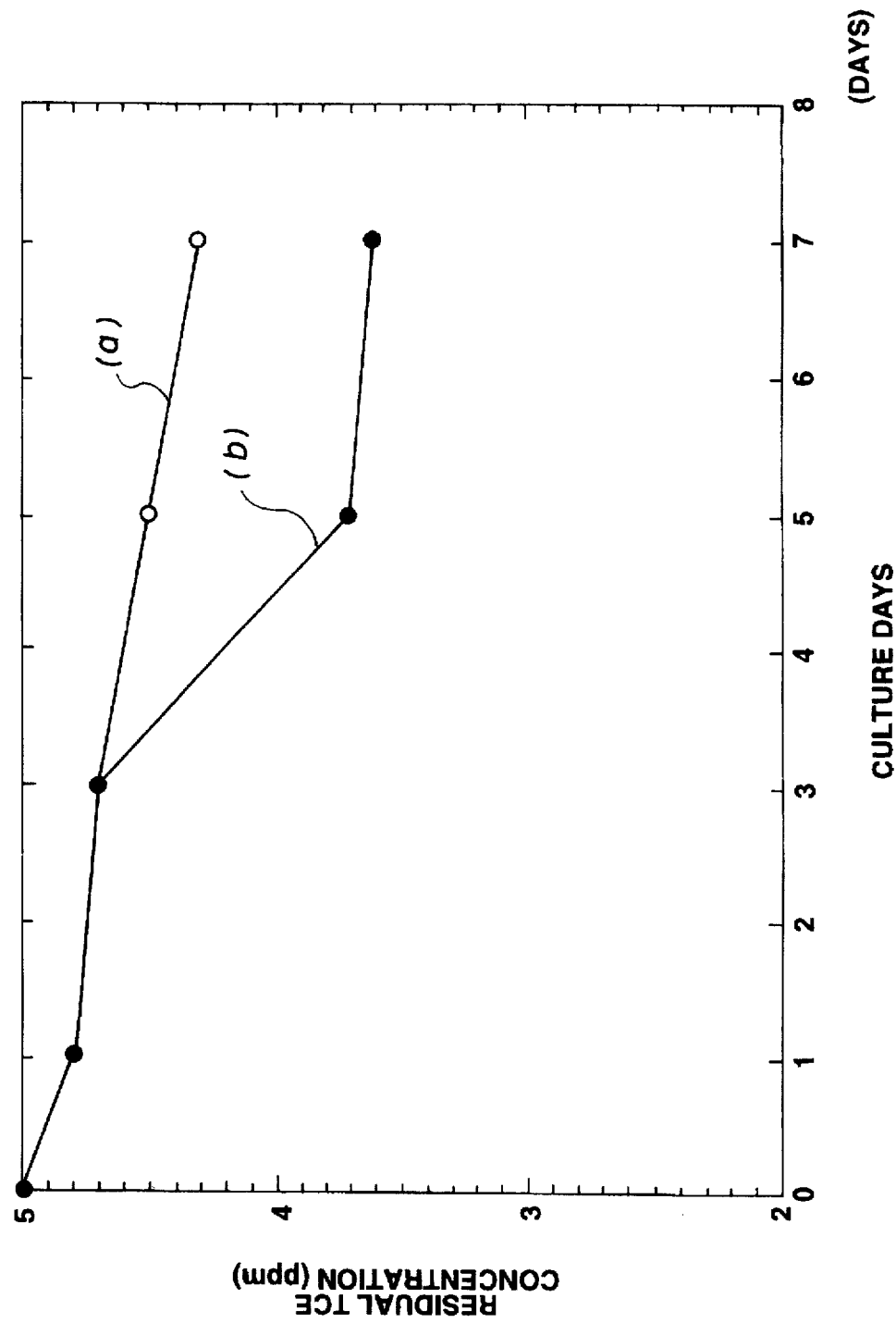
FIG. 4 is a graph which shows the decomposition of TCE with p-coumaric acid and strain BH as described in Example 4. The curve (a) shows the change in TCE concentration of a sample containing strain BH and sodium glutamate. The curve (b) shows the change of TCE concentration of a sample containing strain BH, sodium glutamate and p-coumaric acid.

2 kinds of M9 medium were made in the same manner as in Example 8, and strain BH was cultured using these media to observe a change of TCE concentration. The result was shown in FIG. 4. According to FIG. 4, in the system which p-coumaric acid was added, decomposition of TCE was notable after 3 days culture as compared to the system which p-coumaric acid was not added, and TCE was decomposed to 3.6 ppm after 7 days culture.

Example 10

Figure 5:
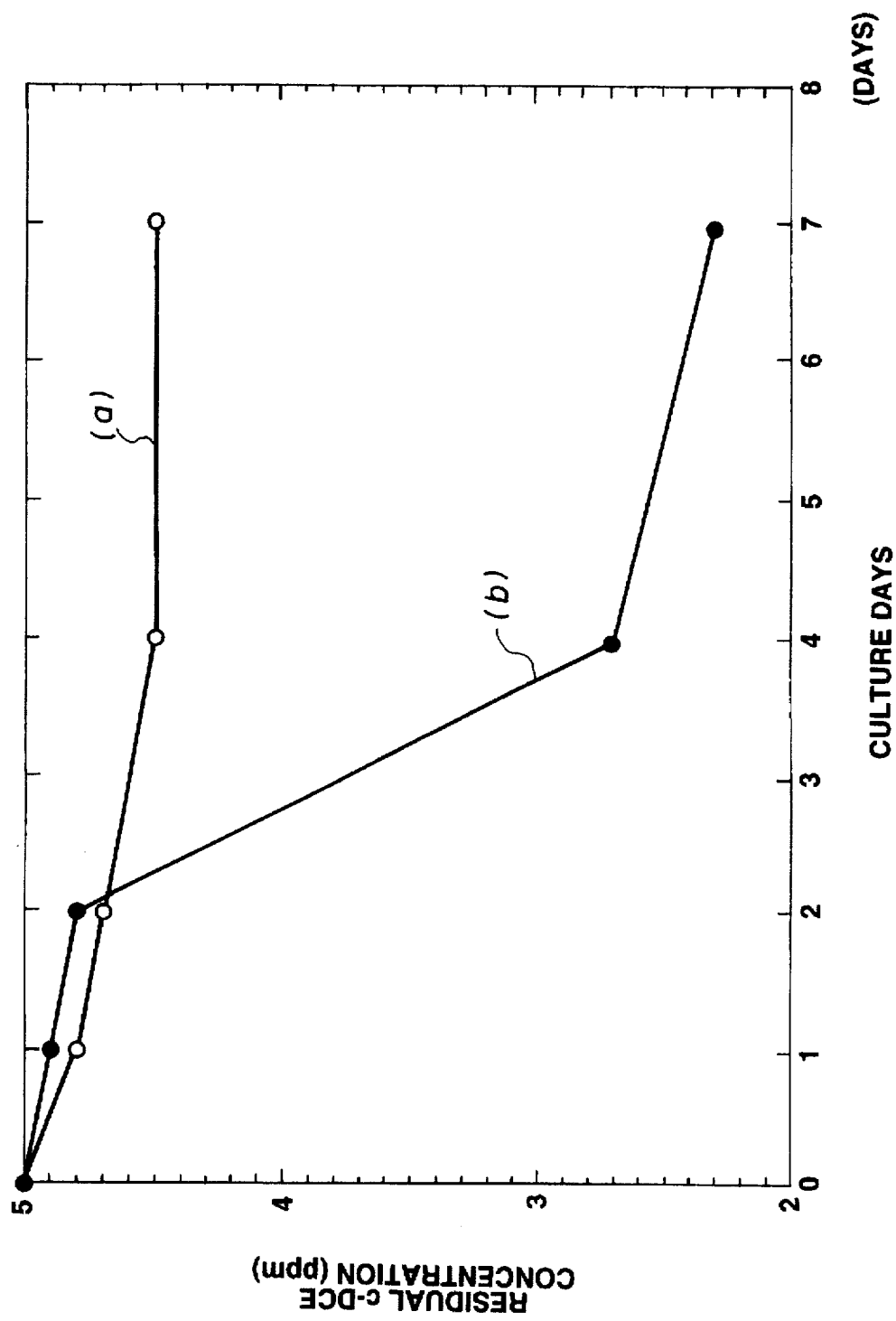
FIG. 5 is a graph which shows decomposition of c-DCE with p-coumaric acid and strain KK01 as described in Example 10. The curve (a) shows the change of c-DCE concentration of a sample containing strain KK01 and sodium glutamate. The curve (b) shows the change of c-DCE concentration of a sample containing strain KK01, sodium glutamate and p-coumaric acid.

2 kinds of M9 medium were made in the same manner as in Example 8 except that the chloroorganic compound was replaced by cis-1,2-dichloroethylene (c-DCE), and strain KK01 was cultured in these media to observe a change of TCE concentration. The result is shown in FIG. 5. According to FIG. 5, in the system which p-coumaric acid was added, decomposition of TCE was notable after 2 days culture as compared to the system which p-coumaric acid was not added, and TCE was decomposed to 2.3 ppm after 7 days culture.

Example 11

In the above fine sand culture system, p-coumaric acid was added to deionized water which TCE was added to be 2.4 mg/kg of the concentration to be 100 ppm of p-coumaric acid concentration, and the ionized water was added to air-dried sand in a serum bottle to make fine sand containing water. Strain KK01 was cultured using this medium to observe TCE decomposition (evaluate a change of TCE concentration). In addition, strain KK01 was cultured using a medium which p-coumaric acid was not added to observe TCE decomposition. The result is shown in FIG. 6. According to FIG. 6, in the system which p-coumaric acid was added, decomposition of TCE was notable after 4 days culture as compared to the system which p-coumaric acid was not added, and TCE was decomposed to 0.75 ppm after 7 days culture.

Example 12

An extract from the fine sand in the above example was cultured in M9 medium containing 100 ppm of phenol and 0.2% of sodium glutamate, then 9 kinds of colony were formed. These colonies were cultured in two systems in which one was a fine sand system containing deionized water which contains 100 ppm of p-coumaric acid, and another did not contain p-coumaric acid to evaluate decomposition of TCE which the initial concentration in the fine sand was 2.0 mg/kg. Then there was a bacterium which could decompose TCE, and the result of TCE decomposition with the bacterium was shown in FIG. 7.

According to FIG. 7, in the system which p-coumaric acid was added, decomposition of TCE was notable after 4 days culture as compared to the system which p-coumaric acid was not added, and TCE was decomposed to 0.98 ppm after 7 days culture.

As described above, when the p-coumaric acid or the water soluble element extracted from a plant containing lignocellulose is brought into contact with a microorganism whose ability to decompose a chloroorganic compound can be induced by an aromatic compound which is an inducible compound, the ability can be activated without using a harmful and dangerous inducible compound. Thereby, it is not necessary to take any measures to prevent scattering of dangerous compounds, and a chloroorganic compound can be decomposed easily and safely.

When the microorganism is cultured in a medium with an aromatic compound previously before bringing the microorganism into contact with p-coumaric acid or the water soluble element, in case of decomposing a chloroorganic compound with the microorganism, the microorganisms activity for the decomposition is increased without using an aromatic compound, and the activity in heighten more with the water soluble element. Thereby, the safe and easy decomposition and purification with a microorganism can be done more efficiently.

When an extract extracted with water by an operation of high temperature immersion, an operation of high pressure immersion, an operation of microwave irradiation or extraction with alkali is used as the water soluble material, effective material is extracted into the water soluble phase efficiently. Thereby, the ability is activated all the more. As an inducible compound in the water soluble phase, water soluble lignocellulose, that is, lignocellulose which has been decomposed into lower molecular weight products is the most effective. When a microorganism which belongs to Pseudomonas genus is used as the microorganism, the decomposing ability is also increased, and microorganisms which belong to the Pseudomonas genus may preferably be selected from *Pseudomonas cepacia* or *Pseudomonas putida*.

I claim:

1. A process for decomposing dichloroethylene or trichloroethylene with microorganisms which can decompose dichloroethylene or trichloroethylene when activated comprising the steps of:

(a) providing a liquid containing water-soluble lignocellulose extracted from an herbaceous plant by employing extracting method (i), (ii) or (iii) as follows:

(i) extracting an herbaceous plant material with water at a temperature of 100° to 250° C. and under a pressure of 0.05 to 5 MPa;

(ii) extracting an herbaceous plant material with water simultaneously with exposing the plant material to microwaves at a power of 0.5–2 kw per 100 ml and at a frequency of 900 to 2,500 MHz; and (iii) extracting an herbaceous plant material with aqueous alkali at room temperature and at atmospheric pressure;

(b) providing microorganisms capable of decomposing dichloroethylene or trichloroethylene when activated;

(c) inducing the microorganisms to express an enzyme for decomposing dichloroethylene and trichloroethylene by contacting the microorganisms with the liquid containing the water-soluble lignocellulose extracted from the herbaceous plant such that a ratio of amount of solids in the liquid to the number of the microorganisms is from 30 µg/$10^7$ cells—300 µg/$10^7$ cells, thereby activating the microorganisms; and (d) contacting the activated microorganisms with dichloroethylene or trichloroethylene to decompose said dichloroethylene or trichloroethylene.

2. The process according to claim 1, further comprising the steps of:

(e) culturing the microorganisms in a medium containing an aromatic compound; and (f) bringing the cultured microorganisms into contact with the water-soluble material extracted from the herbaceous plants.

3. The process according to claim 1 or 2, wherein the microorganisms which can decompose the dichloroethylene or trichloroethylene belong to the Pseudomonas genus.

4. The process according to claim 3, wherein the microorganisms comprise *Pseudomonas cepacia* or *Pseudomonas putida*.

5. The process according to claim 1 or 2, wherein the extract containing the water-soluble lignocellulose is also brought into contact with the microorganisms during the decomposition of the dichloroethylene or trichloroethylene.

6. The process according to claim 1 or 2, further comprising supporting the microorganisms on a carrier and dispersing the carrier supporting the microorganisms into the environment.

7. The process according to claim 1, wherein the herbaceous plant is rice straw, bagasse or canetop.

* * * * *

UNITED STATES PATENT AND TRADEMARK OFFICE
CERTIFICATE OF CORRECTION

PATENT NO. : 5,693,527

DATED : December 2, 1997

INVENTOR(S): TAKESHI IMAMURA

Page 1 of 4

It is certified that error appears in the above-identified patent and that said Letters Patent is hereby corrected as shown below:

<u>ON THE TITLE PAGE AT [56], OTHER PUBLICATIONS</u>

After "Negoro et al.:" "Microalagae" should read --Microalgae--.

<u>COLUMN 1</u>

Line 37, "Water" should read --water--;
Line 61, "compound-using" should read --compound-using--;
Line 66, "<u>trichosprium</u>" should read --<u>trichosporium</u>--;
Line 67, "De v." should read --Div.--

<u>COLUMN 2</u>

Line 4, "<u>Acinetobactor</u> sp." should read --<u>Acinetobacter</u> sp.--;
Line 11, "17 03" should read --1703--;
Line 14, "microorganism," should read --microorganism--;
Line 41, "a" should be deleted.

<u>COLUMN 3</u>

Line 15, "above mentioned" should read --above-mentioned--;
Line 31, "curve (d)" should read --curve (e)--.

UNITED STATES PATENT AND TRADEMARK OFFICE
CERTIFICATE OF CORRECTION

PATENT NO. :   5,693,527

DATED       :   December 2, 1997

INVENTOR(S):   TAKESHI IMAMURA

It is certified that error appears in the above-identified patent and that said Letters Patent is hereby corrected as shown below:

COLUMN 4

Line 41, "make" should read --makes--;
Line 42, "bring" should read --brings--.

COLUMN 5

Line 14, "100°-250°C." should read 100°-250°C.,--;
Line 25, "NaoH" should read --NaOH--;
Line 27, "Furthermore" should read --Furthermore,--.

COLUMN 6

Line 43, "Pseudomonas ptuida," should read
  --Pseudomonas putida,--;
Line 49, "sludge" should read --sludge,--.

COLUMN 7

Line 5, "dells" should read --cells--;
Line 40, "chloroorganic" should read --the chloroorganic--.

COLUMN 8

Line 27, "polyvinylpyrroidone" should read
  --polyvinylpyrrolidone--.

UNITED STATES PATENT AND TRADEMARK OFFICE
CERTIFICATE OF CORRECTION

PATENT NO. : 5,693,527

DATED : December 2, 1997

INVENTOR(S): TAKESHI IMAMURA

It is certified that error appears in the above-identified patent and that said Letters Patent is hereby corrected as shown below:

COLUMN 9

Line 16, "aluminium" should read --aluminum--;
Line 25, "a" should read --an--.

COLUMN 11

Line 16, "baqasse" should read --bagasse--;
Line 39, "were" should read --are--.

COLUMN 12

Line 6, "was 25 ppm" should read --of 25 ppm--;
Line 42, "was 8.3 ppm of" should read --of 8.3 ppm was--;
Line 63, "aluminium" should read --aluminum--.

COLUMN 13

Line 1, "of" should be deleted;
Line 26, "are" should be deleted;
Line 41, "when" should read --which--;
Line 42, "aluminium" should read --aluminum--.

UNITED STATES PATENT AND TRADEMARK OFFICE
CERTIFICATE OF CORRECTION

PATENT NO. : 5,693,527

DATED : December 2, 1997

INVENTOR(S): TAKESHI IMAMURA

It is certified that error appears in the above-identified patent and that said Letters Patent is hereby corrected as shown below:

COLUMN 14

Line 6, "was" (second occurrence) should read --is--;
Line 64, "was" should read --is--.

COLUMN 15

Line 14, "medium" should read --medium added--;
Line 18, "microorganisms" should read
 --microorganism's--;
Line 20, "in heighten" should read --is heightened--.

Signed and Sealed this

Eleventh Day of August 1998

Attest:

BRUCE LEHMAN

*Attesting Officer*       *Commissioner of Patents and Trademarks*